United States Patent Office 2,771,397
Patented Nov. 20, 1956

2,771,397

ANTIBIOTIC AND METHOD FOR PRODUCING IT BY BACILLUS POLYMYXA

Robert G. Benedict and Frank H. Stodola, Peoria, Ill., assignors to the United States of America as represented by the Secretary of Agriculture No Drawing. Application March 3, 1950,
Serial No. 147,576

4 Claims. (Cl. 195—96)

(Granted under Title 35, U. S. Code (1952), sec. 266)

This application is made under the act of March 3, 1883, as amended by the act of April 30, 1928, and the invention herein described, if patented, may be manufactured and used by or for the Government of the United States of America for governmental purposes without the payment to us of any royalty thereon.

This application is a continuation in part of application Serial No. 764,550, filed July 29, 1947. This invention relates to an antibiotic, particularly a polymyxin which is effective against gram-negative organisms, and to a method for producing it, and has among its objects production of the antibiotic in highly active amounts.

Gram-positive organisms have been controlled to a great extent by known antibiotics such as penicillin. However, certain gram-negative organisms have hitherto been unaffected by such substances.

*Brucella bronchiseptica, Brucella abortus, Alcaligenes fecalis, Phytomonas campestris, Escherichia coli, Aerobacter areogenes, Pseudomonas fluorescens, Salmonella schottmeulleri, Sal. paratyphosus A., Eberthella typhosa, Chromobacterium iodinum,* are among the gram-negative organisms, the growth of which is effectively prevented with the antibiotic of the present invention.

In general, according to the invention, *Bacillus polymyxa* is cultivated in a suitable culture medium, the organisms elaborating the antibiotic in relatively large quantities and in highly active form. The cultivation is continued until substantially maximum yield of polymyxin is produced in the medium. Substantially immediately thereafter the cells are separated from the liquor. The polymyxin is then isolated from the cell-free liquor. The separation and isolation are carried out after not more than five days of fermentation.

More particularly, the *Bacillus polymyxa* is cultivated in an aqueous medium comprising a proteinaceous material, preferably corn steep liquor, in the presence of an assimilable carbon source, preferably glucose. In order to produce the antibiotic we have found it necessary to limit the carbon source, particularly glucose, in the fermentation medium to a maximum of 4 percent. The optimum concentration for antibiotic varies from about 1 percent or slightly less up to 4 percent. In ranges above 4 percent the organism's metabolism pattern is altered and it begins to produce butylene glycol instead of the antibiotic. As described in copending application of Benedict Serial No. 25,775 filed May 7, 1948, the carbon source may be added stepwise, approximately half at the beginning of the fermentation, and the remainder, not to exceed a total of four percent, added during the course of the fermentation.

During the cultivation period, a small quantity of calcium carbonate may be introduced into the medium to insure against drastic lowering of the pH. After cultivation until assay samples of the cell free liquor show substantial activity, the cell mass is separated from the medium. The active substance is then isolated from the remaining liquor. The preferred method of isolation is by adsorption of the substance on active carbon and subsequent removing it by elution from the carbon with organic solvents, such as acidified methanol, preferably methanol containing HCl. The methanol-HCl solution containing the antibiotic may then be concentrated under partial vacuum and the active substance precipitated directly from it by addition of acetone. The substance may also be obtained in solid form by lyophilization. It precipitates from methanol upon treatment with ether, and may be separated from the liquid phase in any desired manner.

At this stage in the preparation, the partially purified solid substance is a light brown powder, non-hygroscopic in character, very soluble in water and methanol. It is only slightly soluble in ethanol and is insoluble in ether and acetone. It may be further purified by passing a solution of it through a column containing Brockman's alumina.

Agitation of the medium under submerged aerobic culture conditions increases the growth of the cells of *Bacillus polymyxa* and decreases the time of maximum yield. Vigorous agitation decreases the cultivation period to a surprising degree. For example, aeration alone within the range of one-fifth to one-fifteenth volume of air per volume of medium per minute effects maximum yield in three to five days, whereas vigorous agitation by means of a variable pitch propeller or the like with only mild aeration effects maximum growth in less than 24 hours.

The antibiotic is quite stable. Activity of the crude culture liquid is not diminished by steaming one hour, and the partially purified solid product loses no activity after two months storage at 8° C. It appears to be a high molecular weight polypeptide or protein.

The peculiar inhibitions shown by this substance appear to differentiate it from antibiotics produced by other members of the genus Bacillus. In relatively high concentrations, it is bactericidal and in more dilute solutions bacteriostatic against various gram-negative bacteria. It is remarkable in that it is highly effective against gram-negative organisms but apparently relatively ineffective against gram-positive organisms.

The preferred medium for producing the substance contains about 2 percent corn steep solids, 4 percent glucose, and 1 percent calcium carbonate. Instead of corn steep liquor, other proteinaceous materials, such as soy flour, wheat gluten, and dried distillers solubles may be used. Other sources of assimilable carbon, such as starch or starchy materials, any of the polysaccharides, monosaccharides, and the like, may be substituted for the glucose.

The species *Bacillus polymyxa* contains a plurality of individual strains, all of which seem capable of elaborating the substance under proper cultural conditions. One particular strain, namely, *Bacillus polymyxa* NRRL B698, produces the substance in a very highly active form and in relatively large amounts, the substance produced being herein referred to as polymyxin D. Satisfactory results are obtained using 18-hour inocula of this organism and conducting the cultivation at about 30° C. The amount of inoculum used may vary over wide limits, but particularly good results have been attained using from 2½ to 4 percent.

The following examples illustrate the invention in greater detail:

*Example I*

An aqueous medium consisting of 2 percent corn steep liquor solids and 4 percent glucose, to which 1 percent calcium carbonate was added, was inoculated with *Bacillus polymyxa* NRRL B698, and agitated in a shaker flask for 4 days, after which time assays showed a maximum production of the polymyxin D.

The polymyxin was recovered in solid form by filtering out the cell mass through Filtercel, contacting the cell free liquor with active carbon to absorb the active substance, eluting the carbon with methanol containing HCl, adding absolute ethanol to the eluate and evaporating it to remove the HCl and traces of water, precipitating the active fraction from the ethanol by the addition of acetone, and separating the precipitate from the liquid phase.

During the fermentation, assays were made at regular intervals. At the end of 48 hours, a sample of the cell free liquor was active in dilutions in the order of 1 part of the liquor to 1000 parts of water measured against a standard organism, Brucella bronchiseptica. At the end of 96 hours, it was active in dilutions in the order of 1 part to 4000 parts of water.

From 5 liters of culture liquor, about 2 to 3 grams of solid is obtained.

*Example II*

The procedure of Example I was repeated, employing, however, 2 percent glucose in the medium instead of 4 percent. The filtration step was considerably facilitated since the culture liquor was much less viscid. The cell-free liquor was more active than that of Example I.

We claim:

1. A process of producing polymyxin comprising cultivating *Bacillus polymyxa* in an aqueous medium comprising a proteinaceous material and in the presence of not more than 4 percent of an assimilable carbon source, continuing said cultivation until substantially maximum yield of polymyxin is produced in the medium, substantially immediately thereafter separating the cells from the liquor and isolating the antibiotic from the cell-free liquor, said separation and isolation being carried out after not more than five days of fermentation.

2. A process of producing polymyxin D comprising cultivating *Bacillus polymyxa* NRRL B-698 in an aqueous medium comprising a proteinaceous material and in the presence of not more than 4 percent of an assimilable carbon source, continuing said cultivation until substantially maximum yield of polymyxin is produced in the medium, substantially immediately thereafter separating the cells from the liquor, contacting the cell-free liquor with active carbon and removing the adsorbed antibiotic from the carbon by elution, said separation and isolation being carried out after not more than five days of fermentation.

3. The process of claim 2 in which the cultivation is carried out under submerged aerobic conditions.

4. The process of claim 2 in which the proteinaceous material comprises corn steep liquor and the medium contains calcium carbonate.

References Cited in the file of this patent

UNITED STATES PATENTS

| | | |
|---|---|---|
| 2,565,057 | Ainsworth | Aug. 21, 1951 |
| 2,571,104 | Benedict | Oct. 16, 1951 |
| 2,599,950 | Stansly et al. | June 10, 1952 |

OTHER REFERENCES

Tilden et al.: Journal Bact., 43, 1942, pages 527 to 544.

Stansly et al.: Bulletin Johns Hopkins Hospital, July 1947, pages 43 to 54.

Stansly and Schlosser: "Studies on Polymyxin," Journal Bact. 54, No. 5, November 1947, pages 549 to 556.

"New Antibiotic is Potent," Science News Letter, March 20, 1948, page 179.

Stansly et al.: Nature, 163, April 1949, page 611.

Stansly: "Am. J. Med. 7: 809, December 1949, page 807.

Stansly: "The Polymyxins," Am. Jour. Med. 7: 807, December 1949.

Jones et al.: Ann. N. Y. Acad. Sci., 51, 5, page 916.

Kagan et al.: Polymyxin B and Polymyxin E, Jour. Lab. and Clinical Med., vol. 37, No. 3 (pages 402–413).

Benedict et al.: Ann. N. Y. Acad. Sci., vol. 51, art. 5, (pages 866–874); Gore et al.; Ibid. (page 926).